United States Patent
Wagatsuma et al.

(10) Patent No.: US 8,760,787 B2
(45) Date of Patent: Jun. 24, 2014

(54) MAGNETIC HEAD HAVING A THERMAL FLY-HEIGHT CONTROL (TFC) STRUCTURE UNDER A FLAT LOWER SHIELD

(75) Inventors: Takashi Wagatsuma, Odawara (JP); Yukimasa Okada, Odawara (JP); Ichiro Oodake, Odawara (JP); Atsushi Kato, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 185 days.

(21) Appl. No.: 13/310,428

(22) Filed: Dec. 2, 2011

(65) Prior Publication Data

US 2013/0141813 A1 Jun. 6, 2013

(51) Int. Cl.
*G11B 5/02* (2006.01)

(52) U.S. Cl.
USPC ............... 360/59; 360/125.31; 360/125.74

(58) Field of Classification Search
USPC .................................................. 460/59, 75
See application file for complete search history.

(56) References Cited

U.S. PATENT DOCUMENTS

| | | | |
|---|---|---|---|
| 6,967,055 B2 | 11/2005 | Sato | |
| 6,999,265 B1 * | 2/2006 | Schreck et al. | 360/75 |
| 7,113,369 B2 * | 9/2006 | Ota et al. | 360/234.5 |
| 7,164,555 B2 | 1/2007 | Kato et al. | |
| 7,203,035 B2 * | 4/2007 | Koide et al. | 360/294.7 |
| 7,420,776 B2 | 9/2008 | Yamanaka et al. | |
| 7,649,714 B2 | 1/2010 | Kato et al. | |
| 7,885,038 B2 | 2/2011 | Kato et al. | |
| 2006/0077591 A1 * | 4/2006 | Kurihara et al. | 360/128 |
| 2008/0155810 A1 | 7/2008 | Hong et al. | |
| 2008/0266716 A1 | 10/2008 | Kato | |
| 2009/0251828 A1 | 10/2009 | Schreck et al. | |
| 2010/0118442 A1 * | 5/2010 | Kuroki et al. | 360/234.3 |
| 2010/0157477 A1 | 6/2010 | Morinaga et al. | |
| 2010/0265618 A1 | 10/2010 | Boutaghou et al. | |
| 2011/0116192 A1 * | 5/2011 | Fujita et al. | 360/235.1 |
| 2012/0105999 A1 * | 5/2012 | Chen et al. | 360/75 |
| 2013/0077189 A1 * | 3/2013 | Kato et al. | 360/75 |
| 2013/0229895 A1 * | 9/2013 | Shiroishi et al. | 369/13.14 |
| 2013/0279039 A1 * | 10/2013 | Shiroishi | 360/48 |
| 2013/0335847 A1 * | 12/2013 | Shiroishi | 360/46 |

FOREIGN PATENT DOCUMENTS

| | | |
|---|---|---|
| JP | 8129738 A | 5/1996 |
| JP | 2007/102957 A | 4/2007 |

* cited by examiner

*Primary Examiner* — Tan X Dinh
(74) *Attorney, Agent, or Firm* — Zilka-Kotab, PC (57) ABSTRACT

In one embodiment, a method includes forming a conducting material above an insulating film, applying a mask to portions of the conducting material in a shape of a TFC structure, removing exposed portions of the conducting material to form the TFC structure, depositing an insulating film above the TFC structure, and planarizing the insulating film to form a planar upper surface of the insulating film. In another embodiment, a magnetic head includes a TFC structure positioned between insulating films and a magnetic element positioned above the TFC structure, the TFC structure configured for providing localized thermal protrusion of the magnetic head on a media facing surface thereof, wherein an upper surface of an upper of the insulating films is planar, the magnetic element includes at least one of a main magnetic pole and a read sensor, and the TFC structure is configured for providing thermal protrusion of the magnetic element.

20 Claims, 8 Drawing Sheets

MAGNETIC HEAD HAVING A THERMAL FLY-HEIGHT CONTROL (TFC) STRUCTURE UNDER A FLAT LOWER SHIELD

FIELD OF THE INVENTION

The present invention relates to magnetic heads in hard disk drives, and more particularly, this invention relates to a lower shield structure of a magnetic head and a method for manufacturing a thermal fly-height control (TFC) structure positioned under a flat lower shield of the magnetic head.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, HDDs have been desired to store more information in its limited area and volume. A technical approach to this desire is to increase the capacity by increasing the recording density of the HDD. To achieve higher recording density, further miniaturization of recording bits is effective, which in turn typically requires the design of smaller and smaller components, along with a reduction in the flying height of the head over the magnetic disk.

The reduction of magnetic spacing between the magnetic disk and the magnetic head is very useful for improving the recording density of a magnetic disk device, and a reduction of the clearance between the disk and head has made a significant contribution to increased recording density. In recent years, a technique for actively controlling clearance, such as thermal fly-height control (TFC) has become more frequently used with an exothermic resistor, for example placed within the magnetic head, using the thermal expansion of the magnetic head due to heat produced by the resistor. This together with lower clearances has contributed to a reduction in the magnetic spacing.

In the most recent application of TFC technology, TFC control is used to create contact between the magnetic disk and the magnetic head, enabling a method to be employed whereby minute clearances of less than a few nanometers can be stably maintained by slightly reducing the amount of electric power supplied to the TFC heater in this state. There are various possible arrangements for a TFC structure which have advantages and disadvantages regarding read/write performance and stability.

SUMMARY

In one embodiment, a method includes forming a conducting material above an insulating film, applying a mask to portions of the conducting material in a shape of a thermal fly-height control (TFC) structure, removing exposed portions of the conducting material to form the TFC structure, depositing a second insulating film above the TFC structure, and planarizing at least the second insulating film to form a planar upper surface of at least the second insulating film.

In another embodiment, a magnetic head includes a first TFC structure positioned between first insulating films, wherein an upper surface of an upper of the first insulating films is planar, a lower sensor shield positioned above the first TFC structure, wherein the lower sensor shield has a planar lower surface due to the planar upper surface of the upper of the first insulating films, a current perpendicular-to-plane (CPP) type read sensor positioned above the lower sensor shield on a media facing side of the magnetic head, the read sensor being configured for reading data from a magnetic medium, an upper sensor shield positioned above the read sensor, a lower return pole positioned above the upper sensor shield, a second TFC structure positioned between second insulating films, wherein an upper surface of an upper of the second insulating films is planar, a stitch pole positioned above the second TFC structure, wherein the stitch pole is recessed from the media facing surface of the magnetic head, a main magnetic pole positioned above and coupled to the stitch pole on the media facing surface of the magnetic head, the main magnetic pole being configured for writing data to the magnetic medium, and a trailing shield positioned above the main magnetic pole on the media facing surface of the magnetic head, wherein the first TFC structure is configured for providing thermal protrusion of the read sensor and the second TFC structure is configured for providing thermal protrusion of the main magnetic pole.

In yet another embodiment, a magnetic head includes a TFC structure positioned between insulating films and a magnetic element positioned above the TFC structure, the TFC structure configured for providing localized thermal protrusion of the magnetic head on a media facing surface thereof, wherein an upper surface of an upper of the insulating films is planar, the magnetic element includes at least one of: a main magnetic pole and a read sensor, and the TFC stricture is configured for providing thermal protrusion of the magnetic element.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a method includes forming a conducting material above an insulating film, applying a mask to portions of the conducting material in a shape of a thermal fly-height control (TFC) structure, removing exposed portions of the conducting material to form the TFC structure, depositing a second insulating film above the TFC structure, and planarizing at least the second insulating film to form a planar upper surface of at least the second insulating film.

In another general embodiment, a magnetic head includes a first TFC structure positioned between first insulating films, wherein an upper surface of an upper of the first insulating films is planar, a lower sensor shield positioned above the first TFC structure, wherein the lower sensor shield has a planar lower surface due to the planar upper surface of the upper of the first insulating films, a current perpendicular-to-plane (CPP) type read sensor positioned above the lower sensor shield on a media facing side of the magnetic head, the read sensor being configured for reading data from a magnetic medium, an upper sensor shield positioned above the read sensor, a lower return pole positioned above the upper sensor shield, a second TFC structure positioned between second insulating films, wherein an upper surface of an upper of the second insulating films is planar, a stitch pole positioned above the second TFC structure, wherein the stitch pole is recessed from the media facing surface of the magnetic head, a main magnetic pole positioned above and coupled to the stitch pole on the media facing surface of the magnetic head, the main magnetic pole being configured for writing data to the magnetic medium, and a trailing shield positioned above the main magnetic pole on the media facing surface of the magnetic head, wherein the first TFC structure is configured for providing thermal protrusion of the read sensor and the second TFC structure is configured for providing thermal protrusion of the main magnetic pole.

In yet another general embodiment, a magnetic head includes a TFC structure positioned between insulating films and a magnetic element positioned above the TFC structure, the TFC structure configured for providing localized thermal protrusion of the magnetic head on a media facing surface thereof, wherein an upper surface of an upper of the insulating films is planar, the magnetic element includes at least one of: a main magnetic pole and a read sensor, and the TFC structure is configured for providing thermal protrusion of the magnetic element.

Figure 1:
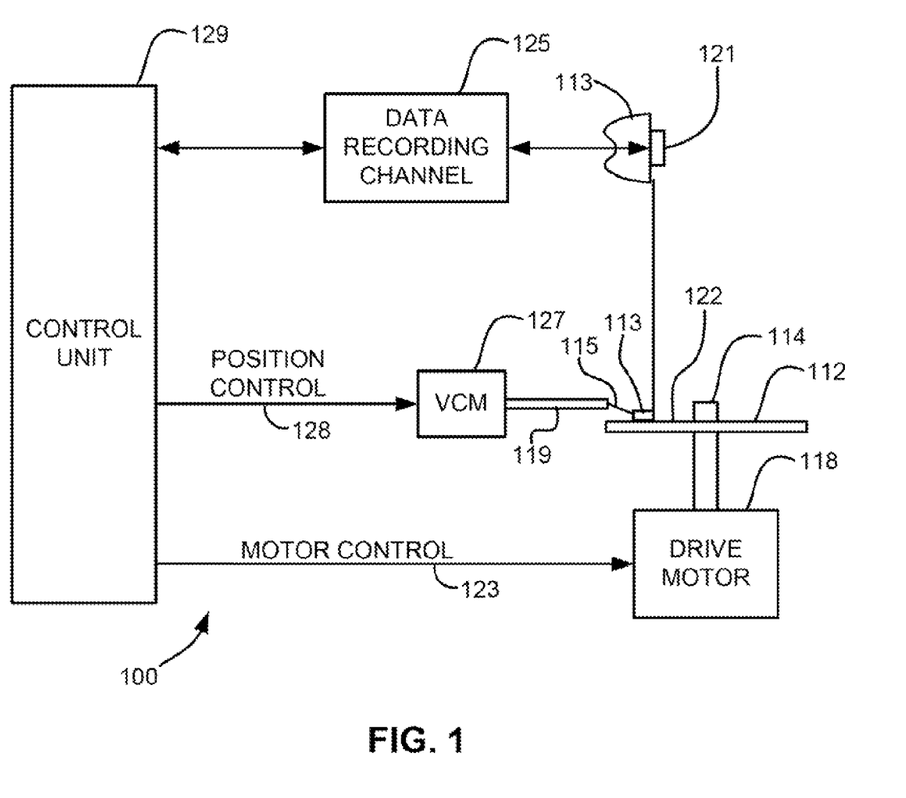
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figures 2A, 2B:
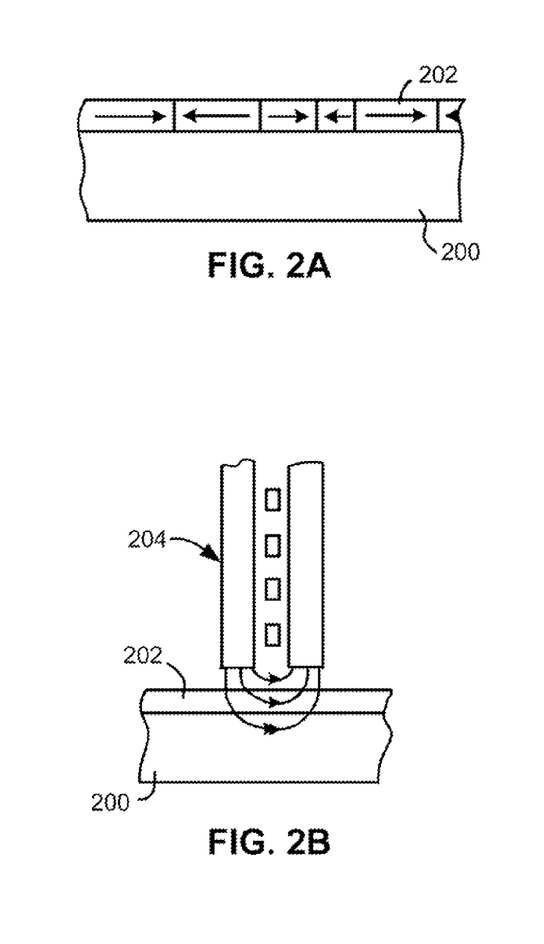
FIG. 2A is a schematic representation in section of a recording medium utilizing a longitudinal recording format.
FIG. 2B is a schematic representation of a conventional magnetic recording head and recording medium combination for longitudinal recording as in FIG. 2A.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

Figures 2C, 2D, 2E:
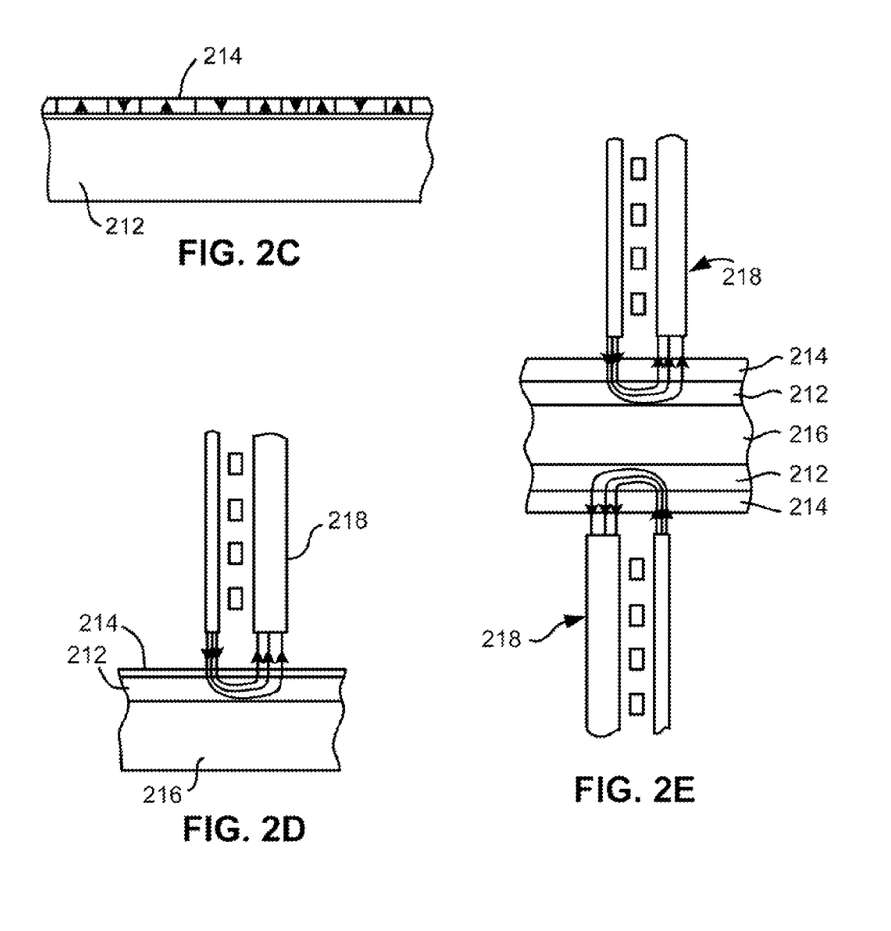
FIG. 2C is a magnetic recording medium utilizing a perpendicular recording format.
FIG. 2D is a schematic representation of a recording head and recording medium combination for perpendicular recording on one side.
FIG. 2E is a schematic representation of a recording apparatus adapted for recording separately on both sides of the medium.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

Figure 3A:
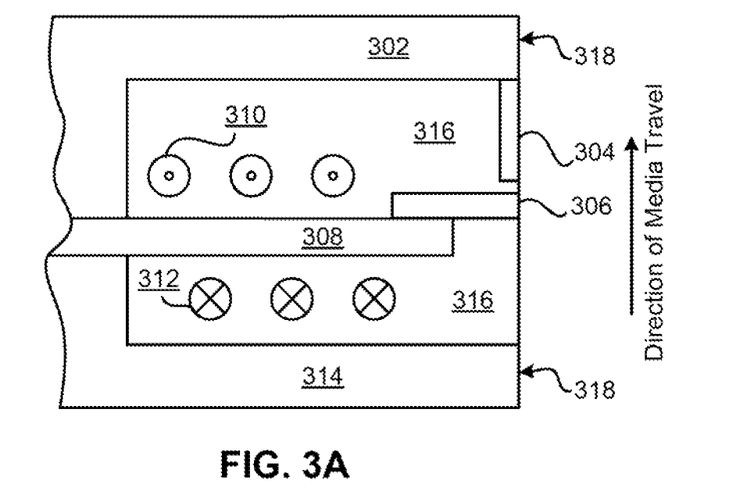
FIG. 3A is a cross-sectional view of one particular embodiment of a perpendicular magnetic head with helical coils.

FIG. 3A is a cross-sectional view of a perpendicular magnetic head. In FIG. 3A, helical coils 310 and 312 are used to create magnetic flux in the stitch pole 308, which then delivers that flux to the main magnetic pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

Figure 3B:
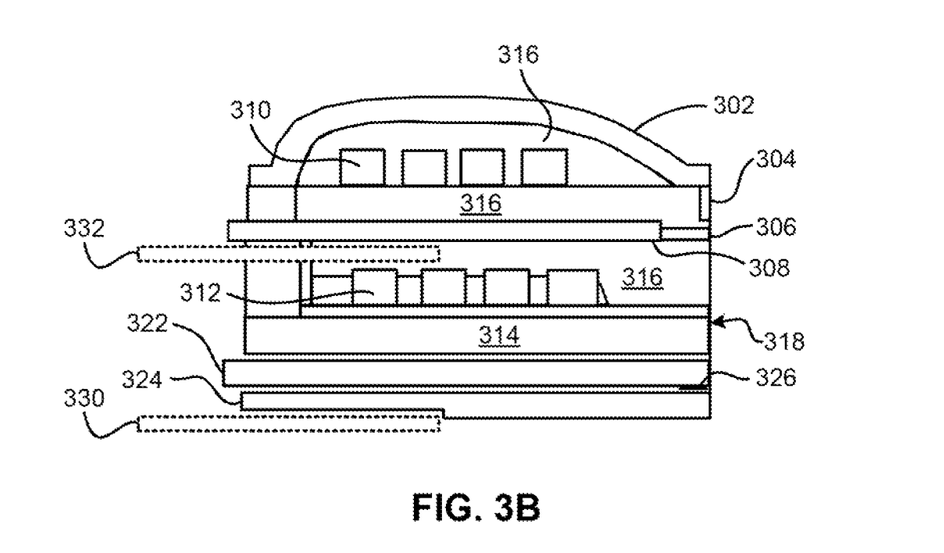
FIG. 3B is a cross-sectional view of one particular embodiment of a piggyback magnetic head with helical coils.

FIG. 3B illustrates a piggyback magnetic head having similar features to the head of FIG. 3A. The lower return pole 314 and the trailing shield 304 flank the stitch pole 308 and main magnetic pole 306. Also, upper sensor shield 322 and lower sensor shield 324 are shown. The sensor 326 is typically positioned between the upper and lower sensor shields 322, 324, and may be a current-perpendicular-to-plane (CPP) element in some approaches. Insulation 316, which may comprise one or more insulating layers, is provided to insulate components to avoid interaction therebetween.

In FIG. 3B, an optional thermal fly-height control (TFC) structure 330 is shown near the non-ABS side of the magnetic head. The TFC structure 330 may also be included in the magnetic head shown in FIG. 3A. The position of the TFC structure may vary based on design parameters, such as where the head protrusion is desired, coefficients of thermal expansion of the surrounding layers, etc. In another embodiment, a TFC structure 332 may be located between the main magnetic pole 306 and the lower return pole 314, either in addition to or in place of TFC structure 330.

With the first TFC structure 330, the lower sensor shield 324 shape may be uneven, as indicated by the uneven lower surface of the lower sensor shield 324, due to a difference in an upper surface of the TFC structure 330.

Figure 4A:
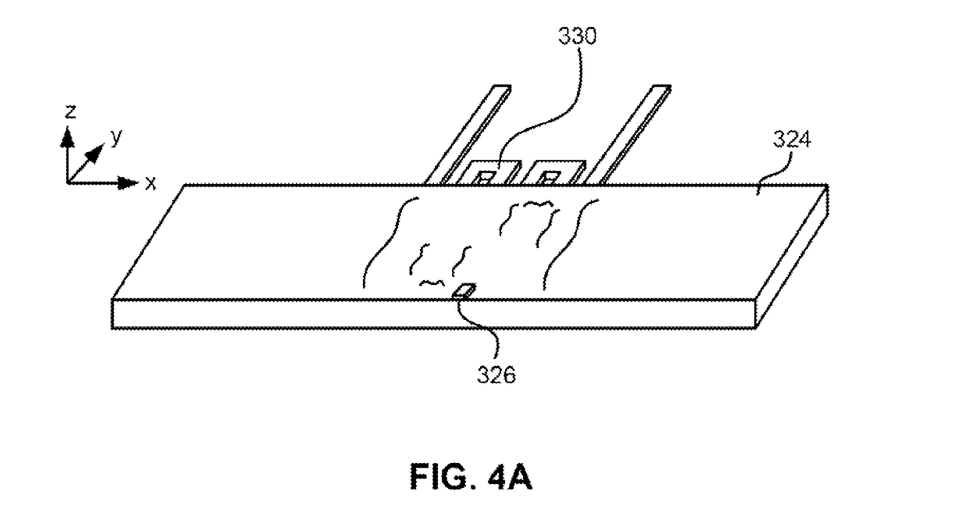
FIG. 4A is an isometric view of a thermal fly-height control (TFC) structure under a shield according to one embodiment.
Figure 4B:
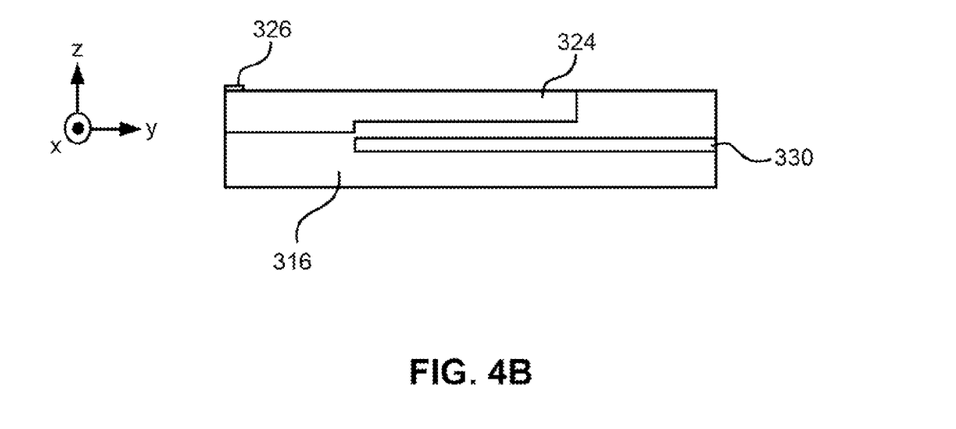
FIG. 4B is a side view of a TFC structure under a shield according to one embodiment.

Referring now to FIG. 4A, which shows an isometric view of a TFC structure 330 under a lower sensor shield 324 along with a sensor 326, it can be seen that the TFC structure 330 is uneven, and causes an upper surface of the lower sensor shield 324 to also become uneven when it is formed above the TFC structure 330. FIG. 4B shows a cross-sectional view of the TFC structure 330, the lower sensor shield 324, the sensor 326, and insulating films 316, according to one embodiment. As can be seen, the TFC structure 330 may have a direct or indirect effect on an upper surface of the lower sensor shield 324. However, this is not a particular problem in terms of data reproduction characteristics when used at conventional recording densities.

However, to accommodate higher recording densities, a distance between the lower sensor shield 324 and a tunneling magnetoresistance (TMR) film that may be used for the sensor 326 is decreased along with a decrease in the read gap, and as a result, the effect of shield instability on data reproduction becomes apparent. This uneven shield shape cannot be ignored when producing magnetic heads for use in high recording density applications.

Figure 5A:
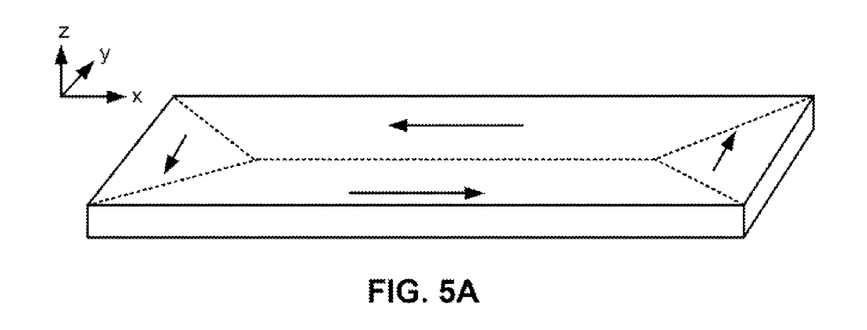
FIG. 5A is a schematic diagram of magnetic domains of a shield according to one embodiment.
Figure 5B:
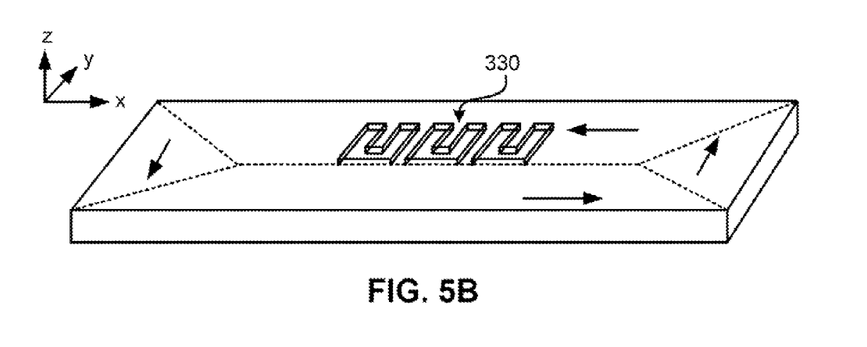
FIG. 5B is a schematic diagram of magnetic domains of a shield having a TFC structure thereunder according to one embodiment.

The magnetic domain structure of the lower sensor shield 324 may be counted as stable in that it has a closed domain structure in which magnetic charge distribution is restricted (the magnetic flux is macroscopically closed). However, there is an issue when the lower sensor shield 324 shape is uneven in that the magnetic charge becomes distributed, so the magnetic domain structure becomes unstable, as shown in FIGS. 5A-5B.

As shown in these figures, the magnetic domain is indicated by the vertically aligned arrows, while the magnetization is indicated by the horizontally aligned arrows. The dashed lines indicate the domain walls of the magnetic domains. As indicated by FIG. 5B, the magnetic charge is distributed near the unevenness caused by the TFC structure 330, thereby destabilizing the magnetic domain structure.

Figure 6:
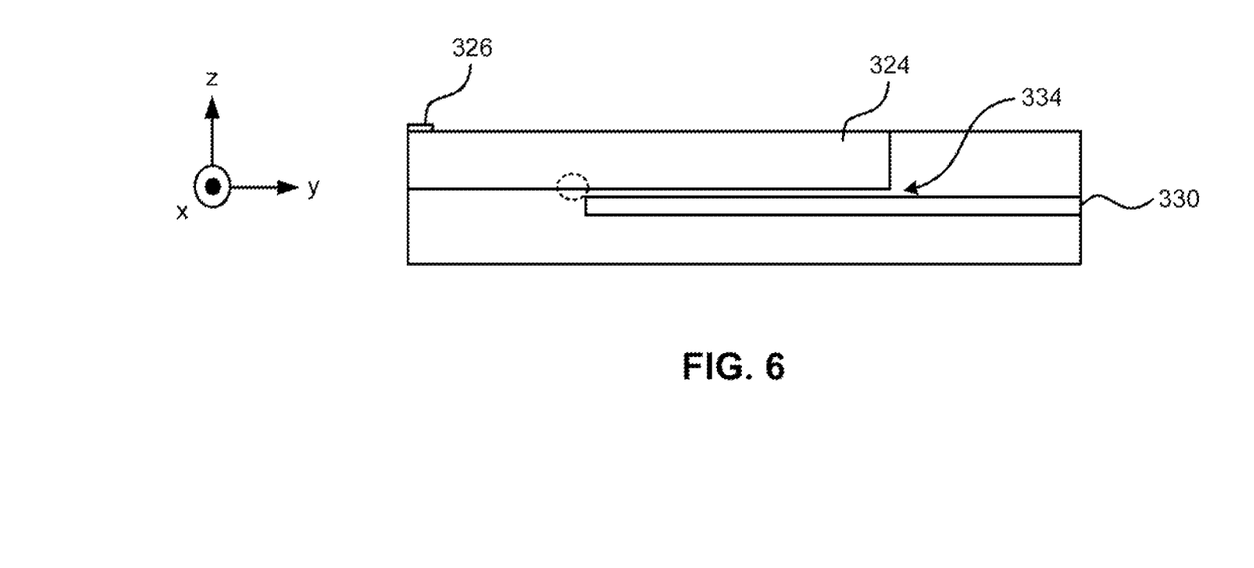
FIG. 6 shows a structure in which any unevenness in the lower sensor shield shape is planarized during formation of the TFC structure, according to one embodiment.

Now referring to FIG. 6, a structure is shown in which any unevenness in the lower sensor shield 324 shape caused by the difference in level of the TFC structure 330 is planarized during formation of the TFC structure. The location where unevenness was shown in FIG. 4B is indicated by circle 600 in FIG. 6. This results in a planar surface which does not exhibit unevenness. In one embodiment, chemical mechanical polishing (CMP) may be used to planarize an insulating layer 334 formed on the TFC structure 330. However, if this process is carried out without regard for the amount of planarizing being performed, the insulating layer 334 may become too thin between the TFC structure 330 and the lower sensor shield 324, thereby resulting in insulation between the layers being lost (e.g., there is conduction between the layers).

In order to prevent this situation, a stopper film 338 may be located at the insulating layer 334 which is formed on the TFC structure 330, so that the stopper film 338 is detected during planarizing (such as CMP), and the thickness of the insulating film 334 is controlled.

In further embodiments, an upper surface of the lower sensor shield 324 shape may also be planarized.

Planarizing the lower sensor shield 324 produces a closed structure in which magnetic charge distribution is restricted and the lower sensor shield 324 magnetic domain is stable, according to one embodiment.

In one embodiment, a magnetic head comprises a TFC structure positioned between insulating films, the TFC structure configured for providing localized thermal protrusion of the magnetic head on a media facing surface thereof, wherein an upper surface of an upper of the insulating films is planar and a magnetic element positioned above the TFC structure, the magnetic element comprising at least one of: a main magnetic pole and a read sensor, wherein the TFC structure is configured for providing thermal protrusion of the magnetic element.

In one embodiment, a lower sensor shield may be positioned above the TFC structure, wherein the lower sensor shield has a planar lower surface due to the planar upper surface of the upper of the insulating films, an upper sensor shield may be positioned above the magnetic element, and a lower return pole may be positioned above the upper sensor shield, wherein the magnetic element is a CPP type read sensor. In this embodiment, a magnetic charge distribution of the lower sensor shield is restricted, and a magnetic domain of the lower sensor shield is stable.

This magnetic head described above may be used in a magnetic data system, such as that shown in FIG. 1. For example, the magnetic data system may comprise a magnetic disk medium, at least one magnetic head as described above, a drive mechanism for passing the magnetic disk medium over the at least one magnetic head, a controller electrically coupled to the at least one magnetic head for controlling operation of the at least one magnetic head.

In a further approach, a stitch pole may be positioned above the TFC structure and below the magnetic element, wherein the magnetic element is a main magnetic pole coupled to the stitch pole and configured for writing data to a magnetic medium and a trailing shield may be positioned above the main magnetic pole on a media facing surface of the magnetic head, wherein the stitch pole is recessed from the media facing surface of the magnetic head and the TFC structure is configured for providing thermal protrusion of at least the main magnetic pole. In this approach, a magnetic charge distribution of the stitch pole is restricted and a magnetic domain of the stitch pole is stable.

This magnetic head may be used in a magnetic data system, such as that shown in FIG. 1. For example, the magnetic data system may comprise a magnetic disk medium, at least one magnetic head as described above, a drive mechanism for passing the magnetic disk medium over the at least one magnetic head, and a controller electrically coupled to the at least one magnetic head for controlling operation of the at least one magnetic head.

In another embodiment, an underlayer may be positioned below the lower sensor shield.

According to one approach, a thickness of an insulating film above the TFC structure is at least a thickness sufficient to prevent conduction between a nearest non-insulating layer (such as the read sensor, the main magnetic pole, the lower sensor shield, etc.) and the TFC structure.

In one embodiment, the insulating films may comprise alumina and the TFC structure may comprise NiCr.

In one embodiment, a magnetic head may comprise both a lower and upper TFC structure, for example TFC structures 330 and 332 as shown in FIG. 3B, one for the read sensor and one for the main magnetic pole. For example, a magnetic head may comprise a first TFC structure positioned between first insulating films, wherein an upper surface of an upper of the first insulating films is planar, a lower sensor shield positioned above the first TFC structure, wherein the lower sensor shield has a planar lower surface due to the planar upper surface of the upper of the first insulating films, a CPP type read sensor positioned above the lower sensor shield on a media facing side of the magnetic head, the read sensor being configured for reading data from a magnetic medium, an upper sensor shield positioned above the read sensor, a lower return pole positioned above the upper sensor shield, a second TFC structure positioned between second insulating films, wherein an upper surface of an upper of the second insulating films is planar, a stitch pole positioned above the second TFC structure, wherein the stitch pole is recessed from the media facing surface of the magnetic head, a main magnetic pole positioned above and coupled to the stitch pole on the media facing surface of the magnetic head, the main magnetic pole being configured for writing data to the magnetic medium, and a trailing shield positioned above the main magnetic pole on the media facing surface of the magnetic head, wherein the first TFC structure is configured for providing thermal protrusion of the read sensor, and the second TFC structure is configured for providing thermal protrusion of the main magnetic pole.

This magnetic head may be used in a magnetic data system, such as that shown in FIG. 1. For example, the magnetic data system may comprise a magnetic disk medium, at least one magnetic head as described above, a drive mechanism for passing the magnetic disk medium over the at least one magnetic head, and a controller electrically coupled to the at least one magnetic head for controlling operation of the at least one magnetic head.

Figure 7A:
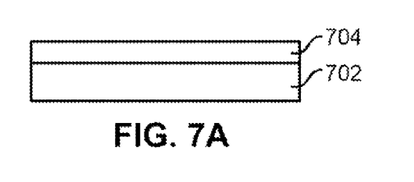
FIGS. 7A-7O show steps in a process of producing a magnetic head, according to one embodiment.
Figure 7B:
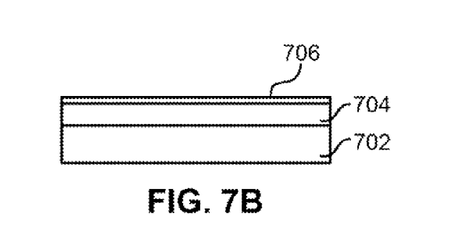
Figure 7C:
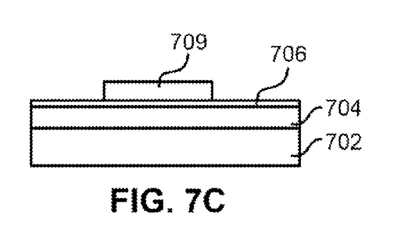
Figure 7D:
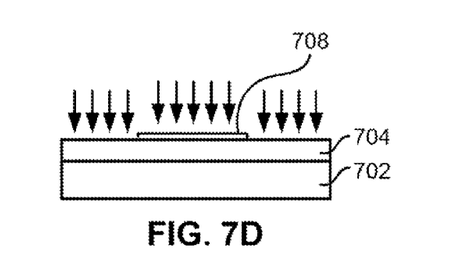
Figure 7E:
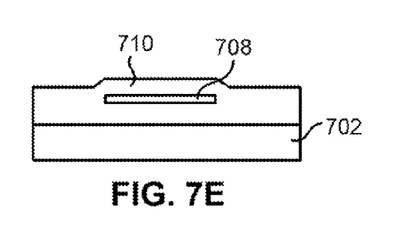
Figure 7F:
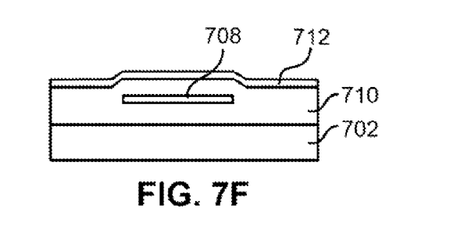
Figure 7G:
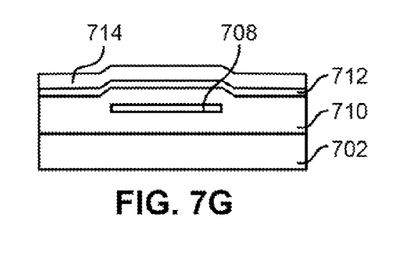
Figure 7H:
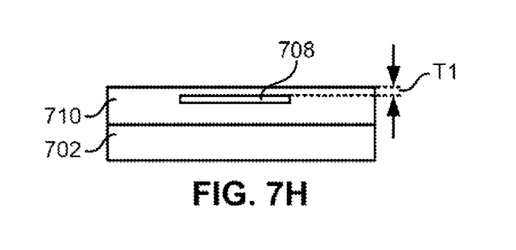
Figure 7I:
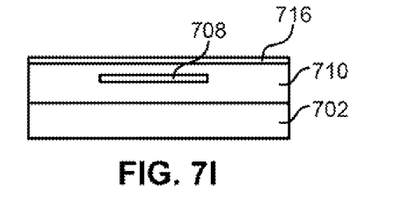
Figure 7J:
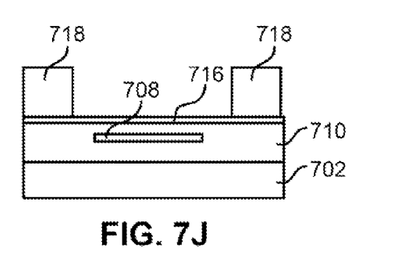
Figure 7K:
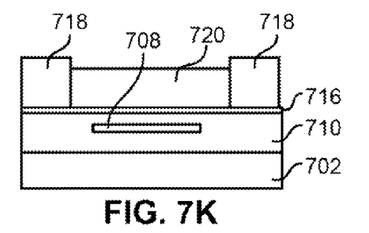
Figure 7L:
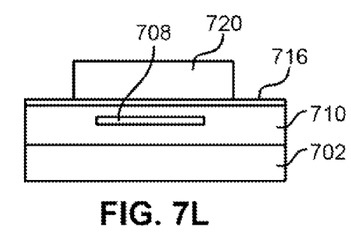
Figure 7M:
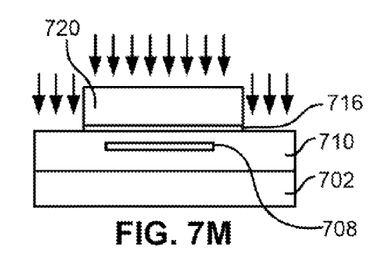
Figure 7N:
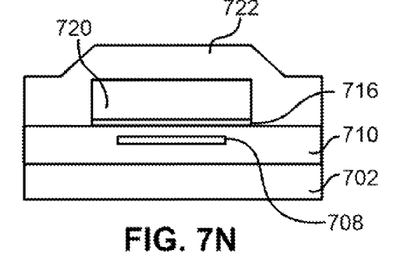
Figure 7O:
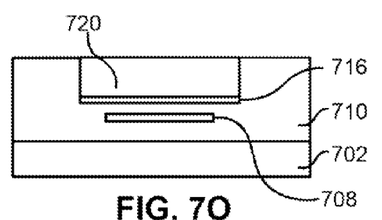

Now referring to FIGS. 7A-7O, a method for producing a magnetic head is shown according to one embodiment. The method may be carried out in any desired environment, including those described herein, among others not specifically described.

In FIG. 7A, an insulating film 704 is deposited above a substrate 702 using any method known in the art, such as sputtering, plating, etc. The insulating film 704 may comprise any suitable insulating material, such as $Al_2O_3$, MgO, etc.

In FIG. 7B, a conducting material 706 for a TFC structure is deposited above the insulating film 704 according to any technique known in the art. The conducting material may comprise NiCr according to one embodiment.

In FIG. 7C, a mask 709 is applied to a portion of the conducting material 706 that is to remain after removing exposed portions of the conducting material 706, as shown in FIG. 7D, according to one embodiment. The mask 709 may comprise any suitable material as would be known in the art, such as photoresist, in some approaches. The exposed portions of the conducting material 706 may be removed using any technique known in the art, indicated by the down-facing arrows, such as ion milling, reactive ion etching, etc., thereby forming the TFC structure 708. Of course, the removal may be carried out at any desired angle, instead of vertical, as shown.

In FIG. 7E, a second insulating film 710 is deposited above the TFC structure 708 using any technique known in the art. This insulating film 710 may be of the same or a different material than the insulating film 704, as shown in FIGS. 7A-7D. However, for the sake of simplicity, the insulating films will be shown as a single layer 710.

In FIG. 7F, an optional stopper film 712 may be applied above the second insulating film 710 using any method known in the art, such as sputtering, etc.

In FIG. 7G, an optional third insulating film 714 may be formed above the stopper film 712 using a technique known in the art, such as sputtering, etc.

In FIG. 7H, the insulating films are planarized above the TFC structure 708 to form a planar upper surface. In one embodiment which includes the stopper film 712, the stopper film 712 may be detected while planarizing, thereby allowing for control of the thickness of the insulating film 710 above the TFC structure 708, indicated by T1, according to one embodiment. Chemical mechanical polishing (CMP) may be used to planarize the insulating films, according to one embodiment. Of course, any technique known in the art may be used to planarize, according to various embodiments.

In FIG. 7I, a plating underlayer 716 is deposited above the insulating films and the TFC structure 708, using any technique known in the art, such as plating, sputtering, etc.

In FIG. 7J, a second mask 718 is applied to portions of the underlayer 716, using any technique known in the art. The second mask 718 may comprise any suitable material as would be known in the art, such as photoresist, in some approaches. The exposed portions of the underlayer 716 will have a structure formed thereon.

In FIG. 7K, plating 720 is applied to form a lower sensor shield, specifically to exposed portions of the underlayer 716, using any technique known in the art.

In FIG. 7L, the second mask 718 is removed using any technique known in the art, such as stripping, etc.

In FIG. 7M, exposed portions of the underlayer 716 are removed using a method known in the art, such as trimming, etc. Specifically, the portions of the underlayer 716 not below the plating 720 may be removed.

In FIG. 7N, a fourth insulating film 722 is deposited above the plating 720 and exposed insulating films, such as insulating film 710, any remaining third insulating film 714 (FIG. 7H), etc. Any suitable material may be used for the insulating films, such as alumina, magnesium oxide, etc.

In FIG. 7O, an upper surface of the structure is planarized, such as by CMP or any other technique known in the art, to form a planar upper surface and to expose the lower sensor shield 720.

In one embodiment, a method comprises forming a conducting material above an insulating film, applying a mask to portions of the conducting material in a shape of a TFC structure, removing exposed portions of the conducting material to form the TFC structure, depositing a second insulating film above the TFC structure, and planarizing at least the second insulating film to form a planar upper surface of at least the second insulating film.

According to some approaches, a stitch pole may be formed above the TFC structure and a main magnetic pole may be formed above the stitch pole, the main magnetic pole being coupled to the stitch pole and configured for writing data to a magnetic medium. The stitch pole is recessed from a media facing surface of the main magnetic pole, and the TFC structure is configured for providing thermal protrusion of at least the main magnetic pole. A magnetic charge distribution of the stitch pole may be restricted, and a magnetic domain of the stitch pole may be stable in preferred approaches.

The method may also include forming a stopper film above the TFC structure, with the stopper film being used to determine a thickness of the insulating film above the TFC structure in some approaches.

In another approach, an underlayer may be formed above at least the second insulating film, and in further approaches, a lower sensor shield may be formed above the underlayer, the lower sensor shield having a planar lower surface. In even more approaches, a read sensor may be formed above the lower sensor shield, the read sensor being configured for reading data from a magnetic medium and an upper sensor shield may be formed above the read sensor, with the TFC structure being configured for providing thermal protrusion of at least the read sensor.

In this or other approaches, forming the lower sensor shield may include applying a second mask to portions of the underlayer, plating a magnetic material above at least exposed portions of the underlayer, and removing the second mask to form the lower sensor shield, using any methods known in the art. In another embodiment, exposed portions of the underlayer may be removed that are not positioned below the lower sensor shield. In this approach, a magnetic charge distribution of the lower sensor shield is restricted, and a magnetic domain of the lower sensor shield is stable.

In one embodiment, the insulating films may comprise alumina, the conducting material may comprise NiCr, and the planarizing may be performed via chemical mechanical polishing.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising:
   a thermal fly-height control (TFC) structure positioned between insulating films, the TFC structure configured for providing localized thermal protrusion of the magnetic head on a media facing surface thereof, wherein an upper surface of an upper of the insulating films is planar;
   a main magnetic pole positioned above the TFC structure, the main magnetic pole being configured for writing data to a magnetic medium, wherein the TFC structure is configured for providing thermal protrusion of at least the main magnetic pole;
   a stitch pole positioned above the TFC structure and below the main magnetic pole, wherein the main magnetic pole is coupled to the stitch pole; and
   a trailing shield positioned above the main magnetic pole on the media facing surface of the magnetic head,
   wherein an end of the TFC structure farthest from the media facing surface of the magnetic head extends beyond an end of the stitch pole farthest from the media facing surface of the magnetic head.

2. A magnetic head, comprising:
   a thermal fly-height control (TFC) structure positioned between insulating films, the TFC structure configured for providing localized thermal protrusion of the magnetic head on a media facing surface thereof, wherein an upper surface of an upper of the insulating films is planar;
   a current perpendicular-to-plane (CPP) type read sensor positioned above the TFC structure, wherein the TFC structure is configured for providing thermal protrusion of at least the CPP type read sensor;
   a lower sensor shield positioned above the TFC structure, wherein the lower sensor shield has a planar lower surface due to the planar upper surface of the upper of the insulating films;
   an upper sensor shield positioned above the CPP type read sensor; and
   a lower return pole positioned above the upper sensor shield, wherein an end of the TFC structure farthest from the media facing surface of the magnetic head extends beyond an end of the lower sensor shield farthest from the media facing surface of the magnetic head.

3. The magnetic head as recited in claim 2, wherein a magnetic charge distribution of the lower sensor shield is restricted, and wherein a magnetic domain of the lower sensor shield is stable.

4. A magnetic data system, comprising:
   a magnetic disk medium;
   at least one magnetic head as recited in claim 2;
   a drive mechanism for passing the magnetic disk medium over the at least one magnetic head; and
   a controller electrically coupled to the at least one magnetic head for controlling operation of the at least one magnetic head.

5. The magnetic head as recited in claim 1, wherein the stitch pole is recessed from the media facing surface of the magnetic head.

6. The magnetic head as recited in claim 1, wherein a magnetic charge distribution of the stitch pole is restricted, and wherein a magnetic domain of the stitch pole is stable.

7. A magnetic data system, comprising:
   a magnetic disk medium;
   at least one magnetic head as recited in claim 5;
   a drive mechanism for passing the magnetic disk medium over the at least one magnetic head; and
   a controller electrically coupled to the at least one magnetic head for controlling operation of the at least one magnetic head.

8. The magnetic head as recited in claim 2, further comprising an underlayer positioned below the lower sensor shield.

9. The magnetic head as recited in claim 1, wherein a thickness of an insulating film above the TFC structure is at least a thickness sufficient to prevent conduction between a nearest non-insulating layer and the TFC structure.

10. The magnetic head as recited in claim 1, wherein the insulating films comprise alumina and the TFC structure comprises NiCr.

11. A magnetic data system, comprising:
    a magnetic disk medium;
    at least one magnetic head as recited in claim 1;
    a drive mechanism for passing the magnetic disk medium over the at least one magnetic head; and
    a controller electrically coupled to the at least one magnetic head for controlling operation of the at least one magnetic head.

12. A magnetic head, comprising:
    a first thermal fly-height control (TFC) structure positioned between first insulating films, wherein an upper surface of an upper of the first insulating films is planar;
    a lower sensor shield positioned above the first TFC structure, wherein the lower sensor shield has a planar lower surface due to the planar upper surface of the upper of the first insulating films;
    a current perpendicular-to-plane (CPP) type read sensor positioned above the lower sensor shield on a media facing side of the magnetic head, the read sensor being configured for reading data from a magnetic medium;
    an upper sensor shield positioned above the read sensor;
    a lower return pole positioned above the upper sensor shield;
    a second TFC structure positioned between second insulating films, wherein an upper surface of an upper of the second insulating films is planar;
    a stitch pole positioned above the second TFC structure, wherein the stitch pole is recessed from the media facing surface of the magnetic head;
    a main magnetic pole positioned above and coupled to the stitch pole on the media facing surface of the magnetic head, the main magnetic pole being configured for writing data to the magnetic medium; and
    a trailing shield positioned above the main magnetic pole on the media facing surface of the magnetic head,
    wherein the first TFC structure is configured for providing thermal protrusion of the read sensor, and
    wherein the second TFC structure is configured for providing thermal protrusion of the main magnetic pole.

13. A magnetic data system, comprising:
    a magnetic disk medium;
    at least one magnetic head as recited in claim 12;
    a drive mechanism for passing the magnetic disk medium over the at least one magnetic head; and
    a controller electrically coupled to the at least one magnetic head for controlling operation of the at least one magnetic head.

14. The magnetic head as recited in claim 12, wherein a magnetic charge distribution of the lower sensor shield is restricted, and wherein a magnetic domain of the lower sensor shield is stable.

15. The magnetic head as recited in claim 12, wherein a magnetic charge distribution of the stitch pole is restricted, and wherein a magnetic domain of the stitch pole is stable.

16. The magnetic head as recited in claim 12, further comprising an underlayer positioned below the lower sensor shield.

17. The magnetic head as recited in claim 12, wherein a thickness of an insulating film above the TFC structure is at least a thickness sufficient to prevent conduction between a nearest non-insulating layer and the TFC structure.

18. The magnetic head as recited in claim 12, wherein the first insulating films comprise alumina and the first TFC structure comprises NiCr.

19. The magnetic head as recited in claim 2, wherein the planar lower surface of the lower sensor shield is uneven, the lower sensor shield having a first portion aligned with the TFC structure in an element height direction that is higher than a second portion not aligned with the TFC structure in the element height direction.

20. The magnetic head as recited in claim 1, further comprising a coil configured to create magnetic flux in the stitch pole, wherein a turn of the coil closest to the media facing surface of the magnetic head is closer to the media facing surface of the magnetic head than an end of the TFC structure closest to the media facing surface of the magnetic head.

* * * * *

UNITED STATES PATENT AND TRADEMARK OFFICE
CERTIFICATE OF CORRECTION

| | | |
|---|---|---|
| PATENT NO. | : 8,760,787 B2 | Page 1 of 1 |
| APPLICATION NO. | : 13/310428 | |
| DATED | : June 24, 2014 | |
| INVENTOR(S) | : Wagatsuma et al. | |

It is certified that error appears in the above-identified patent and that said Letters Patent is hereby corrected as shown below:

In the specification:

col. 2, line 40 replace "stricture" with --structure--;

col. 3, line 50 replace "stnicture," with --structure--;

col. 4, line 34 replace "desircd" with --desired--;

col. 8, line 6 replace "head, a" with --head, and a--.

Signed and Sealed this
Second Day of September, 2014

Michelle K. Lee
*Deputy Director of the United States Patent and Trademark Office*